United States Patent [19]

Patrick

[11] Patent Number: 4,858,778
[45] Date of Patent: Aug. 22, 1989

[54] FUEL TANK

[75] Inventor: Harvey O. Patrick, Columbia, Md.

[73] Assignee: PATS, Inc., Columbia, Md.

[21] Appl. No.: 156,964

[22] Filed: Feb. 18, 1988

[51] Int. Cl.$^4$ .............................................. B65D 90/22
[52] U.S. Cl. .................................... 220/5 A; 137/574;
220/20.5; 244/135 R
[58] Field of Search ...................... 220/1 B, 5 A, 20.5,
220/22, 71, 72.1, 327, 445, 469; 137/574;
244/128, 135 R, 135 A–135 C

[56]  References Cited

U.S. PATENT DOCUMENTS

| | | | |
|---|---|---|---|
| 2,374,332 | 4/1945 | Crawford | 220/22 |
| 2,648,454 | 8/1953 | Dean | 220/5 A |
| 2,795,257 | 6/1957 | Cunningham | 244/135 B |
| 2,861,708 | 11/1958 | Sasserson | 220/22 |
| 4,251,005 | 2/1981 | Sons et al. | 220/22 |

FOREIGN PATENT DOCUMENTS

| | | | |
|---|---|---|---|
| 0709696 | 8/1931 | France | 244/135 R |
| 0582704 | 11/1946 | United Kingdom | 244/135 R |

*Primary Examiner*—Jimmy G. Foster
*Attorney, Agent, or Firm*—A. W. Breiner

[57] ABSTRACT

This relates to improvements in fuel tanks, and most particularly lightweight fuel tanks for aircraft. Complex and heavy internal supports and baffles are replaced by a support and baffle combination which is very simple, has very few bolts, and includes primarily transverse tubular members which are sufficiently large for a person to place the upper part of his body therein and have radiating, transversely elongated openings through which one's arm may pass so as to facilitate inspection and repair should it be necessary of the interior of the tank. The tank is of a double wall construction and includes an inner skin and outer skin separated by a honeycomb core. Along the longitudinal bottom and top of the tank there are defined troughs which are formed by removing the core between the two facing layers. The bottom trough becomes a sump for the tank, while the top trough becomes a head space. Further, one of the tubular transverse members may have at one end thereof a closed compartment in which suitable controls, such as valves, may be mounted in sealed relation. All of the tubes have at the ends thereof closure discs or doors which are removable and replaceable. Further, in the top and bottom of the tank there may be suitable inspection openings covered by inspection plates.

20 Claims, 4 Drawing Sheets

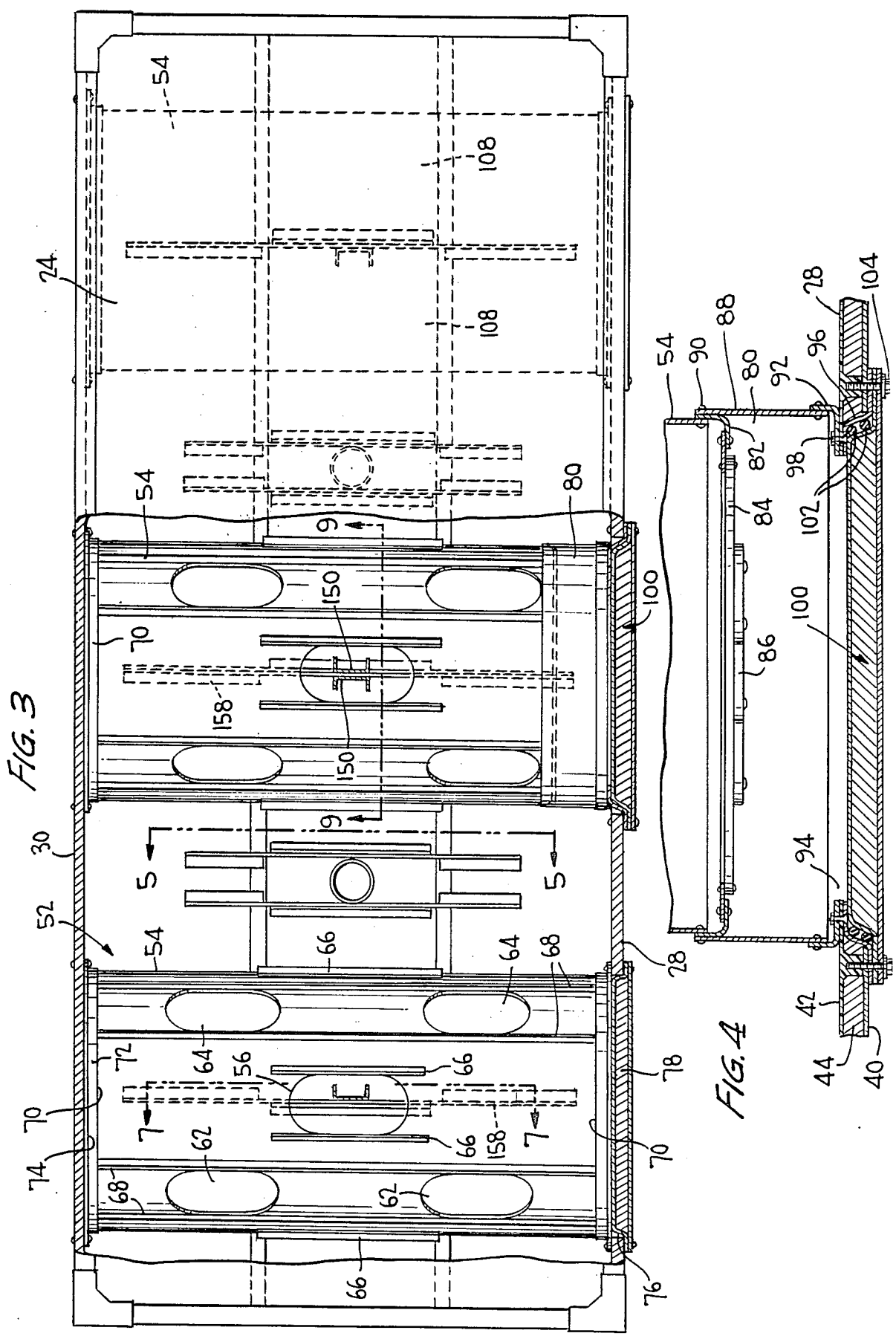

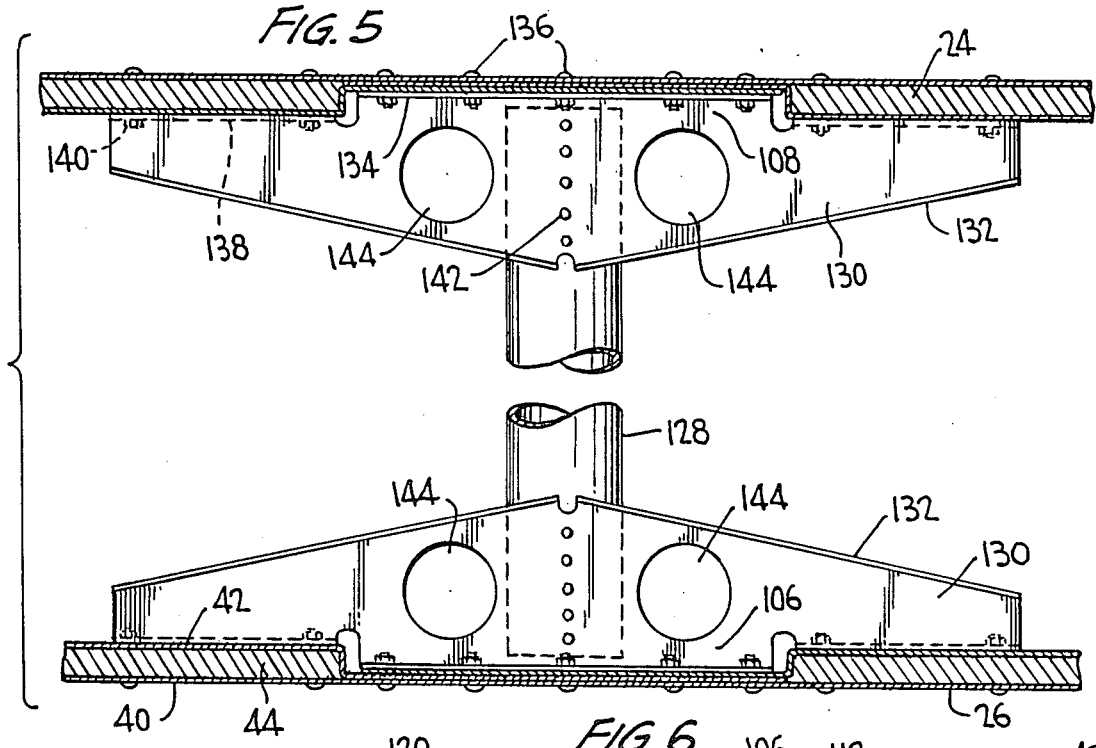
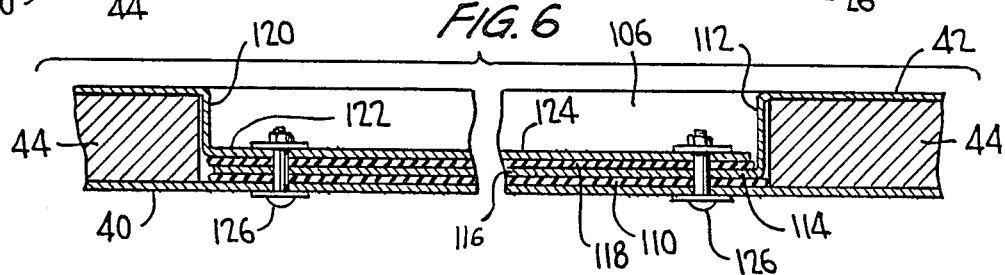
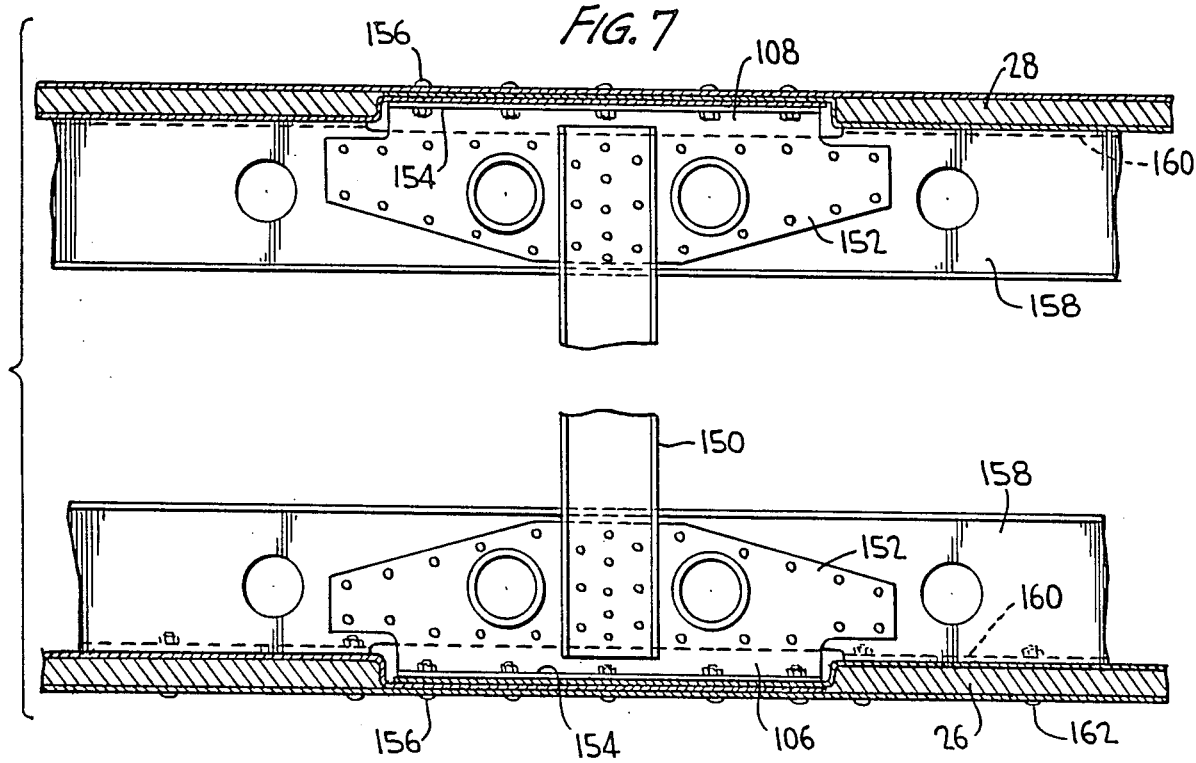

FUEL TANK

FIELD OF INVENTION

This invention relates in general to new and useful improvements in fuel tanks. More particularly, the invention relates to an internal construction of a fuel tank for use in aircraft which reduces the weight of the fuel tank while increasing the tank's strength.

BACKGROUND OF INVENTION

Fuel tanks have been developed in the past for use in aircraft with bolted together internal supports and baffles which have been proven satisfactory in use. One such tank is shown in FIG. 1. However, the large volume of bolts and baffling required and the resultant weight of such bolts and baffles are not desirable. In accordance with this invention, it is proposed to provide a modified form of fuel tank, particularly adapted for use in aircraft, which is much lighter in weight and at the same time provides for greater accessibility to the interior of the fuel tank.

SUMMARY OF INVENTION

Most particularly, in accordance with this invention, an improved fuel tank is provided with a combination internal support and baffle arrangement in the form of a plurality of transversely extending tubular members. These tubular members extend between and are secured to the side walls of the fuel tank. The ends of the tubular members are aligned with openings in the side walls, with the ends of the tubular members being closed by removable doors or panels.

More specifically, the tubular members are of a large diameter construction sufficient for a man to place his arms or even his upper body within the tubular member. The tubular member being of a size to permit the arm and shoulder of a man to extend therethrough into the interior of the fuel tank permits the man to inspect and, if necessary, make certain repairs internally of the fuel tank. At the same time, the tubular members have sufficient supporting strength to maintain a fixed relationship between the side walls while at the same time functioning as baffles.

In accordance with this invention, the top and bottom walls of the fuel tank are separated by upstanding supports which are carried by mounting members which extend transversely of the fuel tank. At least certain of the upright supports extend through vertically aligned openings in the tubular members.

The upright supports are connected to the top and bottom walls of the fuel tank by way of anchoring members which extend transversely of the fuel tank. The fuel tank is so constructed to have a centrally located, longitudinally extending trough in both the bottom wall and the top wall, with the trough in the bottom wall forming a sump and the trough in the top wall forming a head space. The mounting members have mounting flanges which are seated in the troughs and are fixedly secured to the respective top and bottom walls.

The fuel tank is primarily in the form of a housing of a double wall construction including an outer skin, an inner skin, and an intermediate core. The troughs in the top and bottom walls are formed by omitting the core in the area of each trough and securing the inner skin to the outer skin in sealed relation.

It is also proposed to utilize one of the tubular members for the storage of control mechanisms, including valves. As a result, one of the tubular members, adjacent one of the side walls, is provided with a closed extension in the form of a compartment, with access to the compartment being through one of the doors. The door has a removable sealed relationship with respect to the respective side wall.

DETAILED DESCRIPTION AND DRAWING

With the above and other objects in view that will hereinafter appear, the nature of the invention will be more clearly understood by reference to the following detailed description, the appended claims, and the several views illustrated in the accompanying drawings.

FIG. 3 is an enlarged top plan view of the fuel tank of FIG. 2 with parts broken away and shown in section, and shows the internal construction of the fuel tank.

FIG. 4 is an enlarged fragmentary horizontal sectional view taken through an end portion of a central one of the tubular members and shows the details of a compartment formed at that one end.

FIG. 5 is a fragmentary transverse vertical sectional view taken along the line 5—5 of FIG. 3, and shows the details of a typical upright support including the provision of troughs in top and bottom walls of the tank.

FIG. 6 is an enlarged fragmentary sectional view showing the specific details of the construction of the trough in the bottom wall, parts being broken-away.

FIG. 7 is an enlarged fragmentary transverse vertical sectional view with parts broken-away taken generally along the line 7—7 of FIG. 3, and shows the construction of upright supports and baffles utilized in association with one of the tubular members.

Figure 2:
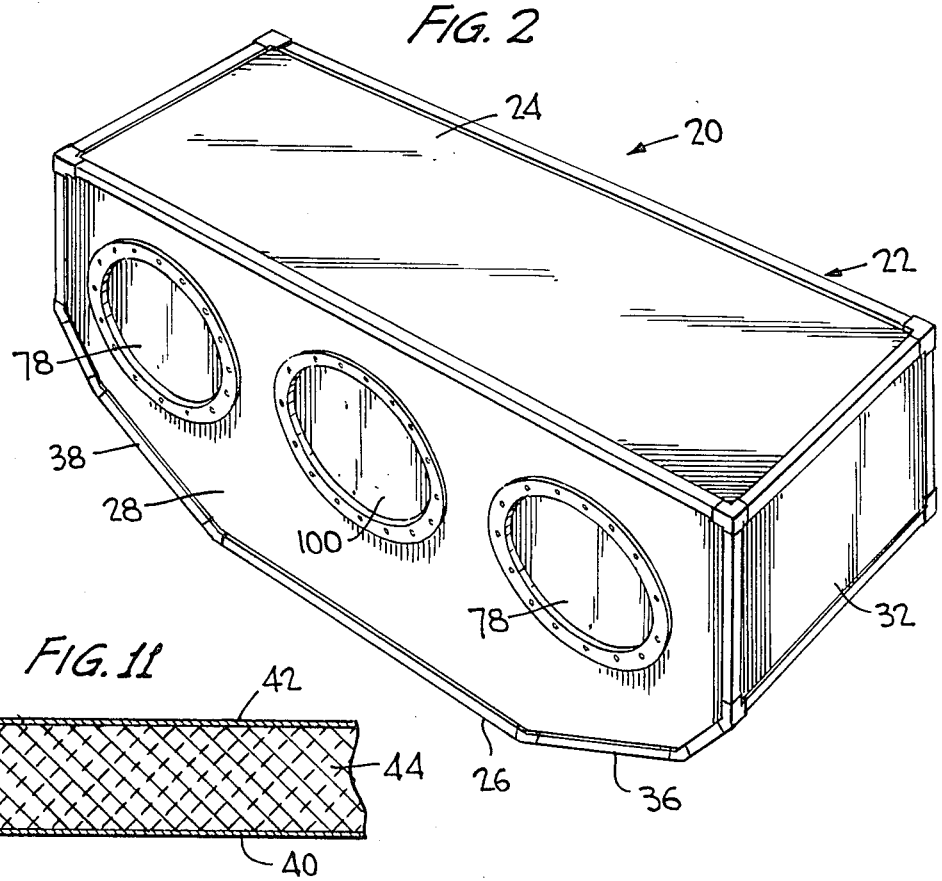
FIG. 2 is a schematic top perspective view of a fuel tank constructed in accordance with this invention.

Referring to the drawing in detail, reference is first made to FIG. 2 wherein there is illustrated a typical tank formed in accordance with this invention, the tank being generally identified by the numeral 20. The tank 20 may be of a configuration to fit within an aircraft fuselage or wing although the configuration of the tank 20 per se forms no part of this invention. Basically, the tank 20 includes a housing, generally identified by the numeral 22, which is of a double wall construction.

The housing 22 is formed of a plurality of wall panels including a top wall 24, a bottom wall 26, side walls 28, 30, end walls 32, 34, and sloping walls 36, 38.

Figure 11:
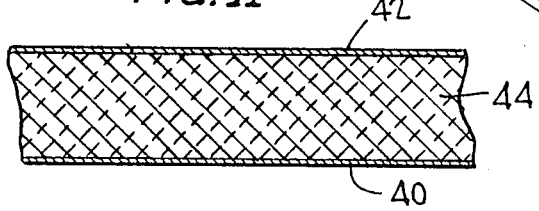
FIG. 11 is a sectional view of a preferred honeycomb material used in the tank construction.

The construction of the housing 22, except for the construction of the individual walls, in no way forms a part of this invention and, therefore, will not be described here. however, as is best shown in FIG. 11, each of the walls of the housing 22 will be of a double wall construction including an outer skin 40, an inner skin 42, and a central core 44. The skins 40 and 42 will be formed of aluminum or other lightweight metal sheet, while the core 44 is preferably of a metallic honeycomb structure.

Figure 1:
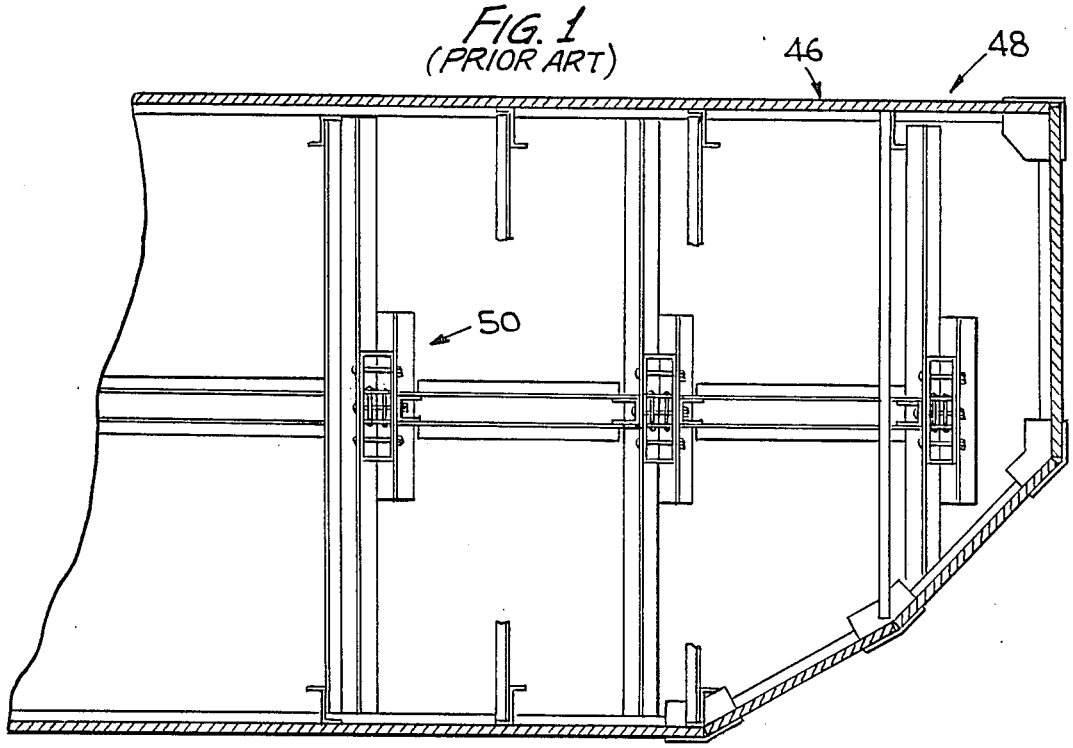
FIG. 1 is a fragmentary longitudinal vertical sectional view taken through an existing fuel tank of the type to which this invention relates.

Reference is now made to FIG. 1 wherein there is illustrated a prior tank construction generally identified by the numeral 46. The tank 46 includes a housing 48 which is substantially identical to the housing 22. The tank 46 has a complex internal support and baffle arrangement, generally identified by the numeral 50. The various supports and baffles are bolted together utilizing bolts. The weight of the bolts renders such construction unsuitable when a lightweight tank is required.

In accordance with this invention, it is proposed to eliminate the support and baffle arrangement shown in FIG. 1 and to provide therefor a support and baffle arrangement in accordance with this invention. This support and baffle arrangement is generally identified by the numeral 52, for example as shown in FIG. 3.

Figure 9:
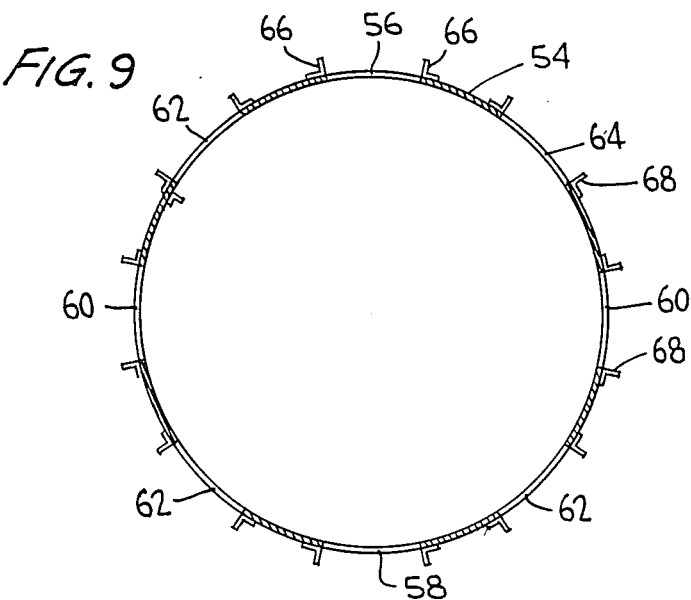
FIG. 9 is a fragmentary transverse vertical sectional view taken generally along the line 9—9 of FIG. 3 and shows the cross-section of a typical tubular member.

Horizontal components of the combined support and baffle arrangement 52 are in the form tubular members 54 which extend between and are secured to the side walls 28, 30. In the illustrated tank, there are three of the tubular members 54 arranged in spaced parallel relation. However, the number of such tubular members would vary depending upon the length of the tank 20. Each tubular member 54 is in the form of a tubular wall rolled from a sheet of lightweight metal. Each tubular member 54 is provided with a series of openings which are elongated longitudinally of the tubular member 54. As is schematically illustrated in FIG. 9, the openings include vertically aligned, centrally positioned upper and lower openings 56, 58, horizontally aligned, centrally located, side openings 60. The openings may also include diagonal sets of openings 62, 64, with the openings 62, 64 being provided in pairs spaced longitudinally of the tubular member 54 as is best shown in FIG. 3.

The tubular wall of the tubular member 54 is reinforced by a series of angle members as is generally shown in FIG. 9, and more specifically shown in FIG. 3. On the exterior of the tubular wall, at each side of each of the openings 56, 58, 60, are short angle members 66; while at each side of the openings 62, 64 are full length angle members 68.

The opposite ends of the tubular members 54, with the exception of one end of the central tubular member, are provided with annular collars 70 which include a cylindrical flange 72 secured to the tubular wall and an annular flange 74 which is secured to the inner surface of the respective one of the side walls 28, 30. Each of the side walls 28, 30 is provided with an opening therethrough in alignment with the respective collar 70. These openings are generally designated by the reference numeral 76 and are of a sealed construction as is best shown in FIG. 4. A double wall or closure 78 is seated in each of the openings 76 and is removably and replaceably secured in place by suitable fasteners 80.

It is also noted that each of the tubular members 54 is of a diameter sufficient to receive the arms and shoulders of a man therein. Further, each of the openings 56, 58, 60, 62, and 64 is of a size to receive the arm of a man so that all internal portions of the tank 20 may be reached.

The central tubular member 70 adjacent the side wall 28 is foreshortened to define a control compartment 80 as is best shown in FIGS. 3 and 4. The control compartment 80 is mounted on the end of the associated tubular member 54 in the manner clearly shown in FIG. 4. This construction includes a collar 82 which includes a cylindrical flange telescoped over the end of the tubular member 54, and an annular flange 82 which has secured thereto a plate 84. The plate 84, in turn, carries a mounting plate 86. The controls are preferably in the form of valves mounted on the mounting plate 86.

The compartment 80 is defined by a cylindrical member 88 which is telescoped over the cylindrical flange of the collar 82, and is secured to the tubular member 54 by means of suitable fasteners 90 which also pass through the collar 82. At the opposite end of the cylindrical member 88 there is another annular collar 92 which is telescoped over the cylindrical member 88 and suitably secured thereto. The collar 92 is also provided with an annular mounting flange which is suitably secured to the side wall 28.

It will be seen that in order to form an opening 94 in alignment with the collar 92, the outer skin 40 and the core 44 are cut away. The inner skin 42 is also cut away, but to a lesser extent. A further collar 96 seals the opening 94 in the side wall 28. The collar 96 has an inner annular flange which is secured to the outer surface of the inner skin 28 by means of fasteners 98 which also secure the collar 92 to the side wall 28. The collar 96 also includes an outer annular flange which overlaps the outer skin 40 and is suitably secured thereto, including by way of an adhesive bond. The collar 96 also includes a generally frustoconical body portion which extends between the annular flanges and which opposed the end of the core 44. The body portion of the collar 96 in effect truly defines the opening 94.

A replaceable door or closure 100 closes the opening 94. Suitable sealing means, preferably in the form of O-rings are positioned between the door 100 and the frustoconical body of the collar 96. The door 100 is of a double wall construction similar to the walls of the housing 22 with the core thereof omitted about the periphery of the door 100 so that the inner and outer skins of the door are brought together about the periphery of the door. The door 100 is releasably secured in place by means of bolts 104 which are spaced about the periphery of the door 100.

Figure 8:
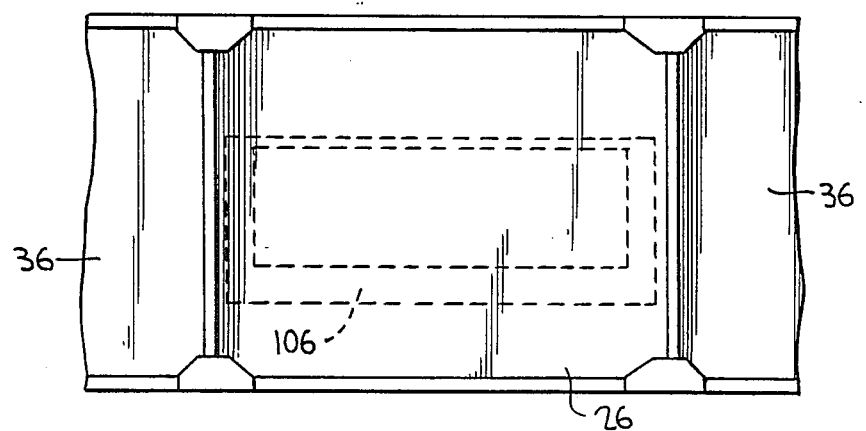
FIG. 8 is a fragmentary bottom plan view of the tank and shows the general outline of the sump and the position of a bottom inspection plate.

Referring now to FIG. 5, it will be seen that the central portion of the top wall 24 and the bottom wall 26 have the core 44 removed therefrom and the inner skin 42 bent around the end of the core and secured in sealing relation to the outer skin 40 in a manner to be described in detail hereinafter and best shown in FIG. 6. This construction provides a longitudinal trough in each of the top wall 24 and the bottom wall 26, with the trough in the bottom wall 26 being in the form of a sump 106 and the trough, which is inverted, in the top wall 24 defining a head space 108. Preferably the sump 106 is formed only in the bottom wall 26 and does not extend into the sloping walls 36, as is best shown in FIG. 8. On the other hand, the head space 108 will extend the full length of the top wall 24, as is best shown in FIG. 3.

Reference is now made to FIG. 6 wherein it is specifically shown how the troughs which form the sump 106 and the head space 108 are formed. It will be seen that the core 44 is discontinued on opposite sides of each of the troughs, for example, the sump 106 of FIG. 6. A sealing layer 110 is then laid on the outer skin 40 between the core portions 44. This is followed by the skin 42 at the right side of the sump 106 being folded down along side the cut edge of the core 44 as at 112, and then folded to form a flange 114 which overlies the sealing layer 110. A spacing layer of a thickness corresponding to the skin 42 also overlies the sealing layer 110 as a continuation of the flange 114. A second sealing layer 118 is then placed into overlying relation with respect to the flange 114 and the spacer 116. Then the left portion of the inner skin 42 is folded down as at 120 against the cut edge of the left hand portion of the core 44. The remainder of the inner skin is in the form of a flange 122 which overlies the sealing layer 120. Finally, a spacer 124 disposed coplanar with the flange 122 is applied in overlying relation to the sealing layer 118. The assembly is then secured together by longitudinally spaced bolt arrangements 126.

Referring now to FIGS. 3 and 5, it will be seen that positions between adjacent tubular members 54 and located transversely centrally of the tank 20 are upright supports 128 which extend generally between the bottom wall 26 and the top wall 24. The supports 28 are mounted with respect to each of the walls 24, 26 by means of elongated mounting members 130 which are formed of sheet metal. Each mounting member 130 has an inner flange 132 and a centrally located outer mounting flange 134. The mounting flange 134 is seated in the respective one of the sump 106 and the head space 108, and is secured to the respective one of the walls 24, 26 by means of bolts 136.

Outer portions of the mounting members 30 are also provided with mounting flanges 138 which are turned towards one another and which are secured to the respective one of the walls 24, 26 by means of bolts 140. The support 128 is secured to respective ones of the mounting members 130 by means of fasteners such as rivets 142.

The mounting members 130 also function as transverse baffles and are provided with suitable through openings 144.

References is now made to FIGS. 3 and 7 wherein there is illustrated the details of an upstanding support in association with a tubular member 54. It will be seen that the upstanding support, which is identified by the numeral 150, extends through the aligned openings 56, 58 in the tubular member and is attached to an elongated mounting member 152. The mounting member 152 is provided with a centrally located mounting flange 154 which is seated in a respective one of the sump 106 and head space 108, and is secured to the respective bottom wall 26 and top wall 24 by bolts 156. In addition, there is provided an elongated baffle 158 carried by each of the bottom wall 26 and the top wall 24. The baffles 158 are positioned between the respective walls and the tubular member 54, and are provided with mounting flanges 160 which are secured by means of bolts 162 to respective ones of the bottom wall 26 and top wall 24.

Referring once again to FIG. 3, it will be noted that with respect to the upright support associated with the center tubular member 54, there are channel members 150 arranged in back-to-back relation on opposite sides of the respective mounting member 152.

Figure 10:
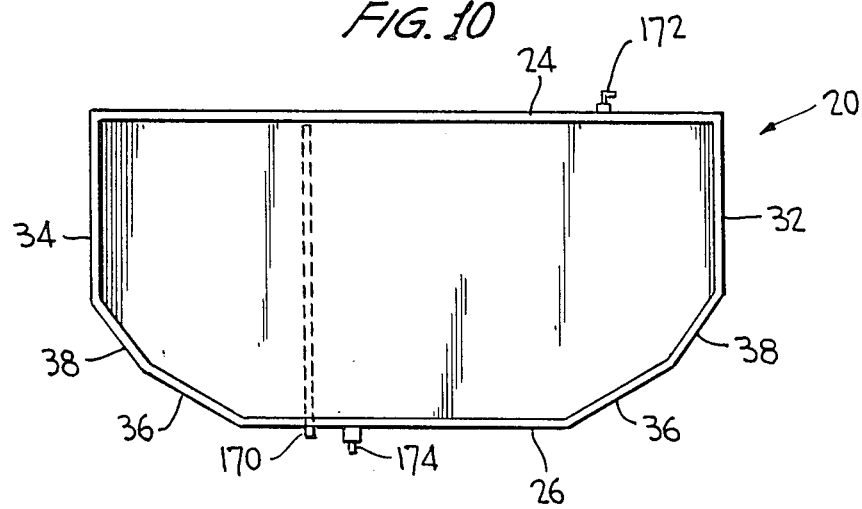
FIG. 10 is a side view of the tank and shows the arrangement of various external connections.

With reference to FIG. 10, it will be understood that the tank 20 will be provided with the usual fitments including a sonic probe 170, a cavity purge 172, and a purge vent/drain 174, among other fitments.

Although only a preferred embodiment of the tank has been specifically illustrated and described herein, it is to be understood that minor variations may be made in the tank construction without departing from the spirit and scope of the invention as defined by the appended claims.

It is claimed:

1. A fuel tank comprising a housing including top and bottom walls and side walls, and combined internal support and baffle means within said housing in part extending between said top and bottom walls and in part extending between said side walls, said combined internal support and baffle means including tubular members extending between said side walls, openings in at least one of said side walls in alignment with said tubular members for providing access to the interiors of said tubular members, and replaceable closure plates secured to said side wall for sealing said side wall openings.

2. A fuel tank according to claim 1 wherein said tubular members each includes a tubular wall, and said tubular wall has openings therethrough providing access to the interior of said housing surrounding said tubular members.

3. A fuel tank according to claim 2 wherein said openings are elongated longitudinally of each tubular member, and said tubular wall is reinforced by reinforcing elements extending longitudinally of said tubular wall immediately adjacent to and on opposite sides of said openings in said tubular wall.

4. A fuel tank according to claim 3 wherein said reinforcing elements are disposed externally of said tubular wall.

5. A fuel tank according to claim 2 wherein said tubular wall has flanges at opposite ends thereof secured to said side walls surrounding said side wall openings.

6. A fuel tank according to claim 2 wherein said tubular members are of a diameter to receive a man's body, and said openings in said tubular wall are of a size to receive a man's arm and shoulder.

7. A fuel tank according to claim 1 wherein said combined support and baffle means include upright supports positioned solely between and adjacent said tubular members, extending between and secured to said top and bottom walls.

8. A fuel tank according to claim 7 wherein each upstanding support is secured to said top and bottom walls by anchoring members arranged generally parallel to said tubular members and fixedly secured to respective ones of said top and bottom walls.

9. A fuel tank according to claim 8 wherein said housing walls are of a double wall construction including a central core, at least certain of said anchoring members include a mounting flange, said core being absent in alignment with said mounting flange and defining an internal recess in a respective one of said top and bottom walls, and said mounting flange being seated in said recess and secured to said double wall.

10. A fuel tank comprising a housing including top and bottom walls and side walls, and combined internal support and baffle means within said housing in part extending between said top and bottom walls and in part extending between said side walls, said combined internal support and baffle means including tubular members extending between said side walls, openings in at least one of said side walls in alignment with said tubular members for providing access to the interiors of said tubular members, and replaceable closure plates secured to said side wall for sealing said side wall openings; said tubular members each including a tubular wall, and said tubular wall having openings therethrough providing access to the interior of said housing surrounding said tubular members; said tubular wall openings of each of said tubular members including generally vertically aligned openings, and said combined internal support and baffle means further including upstanding supports extending through said aligned openings and secured to said top and bottom walls.

11. A fuel tank according to claim 10 wherein each upstanding support is secured to said top and bottom walls by anchoring members arranged generally parallel to said tubular members and fixedly secured to respective ones of said top and bottom walls.

12. A fuel tank according to claim 11 wherein said housing walls are of a double wall construction including a central core, at least certain of said anchoring members include a mounting flange, said core being absent in alignment with said mounting flange and defining an internal recess in a respective one of said top and bottom walls, and said mounting flange being seated in said recess and secured to said double wall.

13. A fuel tank comprising a housing including top and bottom walls and side walls, and combined internal support and baffle means within said housing in part extending between said top and bottom walls and in part extending between said side walls, said combined internal support and baffle means including tubular members extending between said side walls, openings in at least one of said side walls in alignment with said tubular members for providing access to the interiors of said tubular members, and replaceable closure plates secured to said side wall for sealing said side wall openings; one end of one of said tubular members being closed in spaced relation from a respective one of said side walls to form a sealed compartment opening through said one side wall, said compartment forming space for control means.

14. A fuel tank comprising a housing including top and bottom walls and side walls, and combined internal support and baffle means within said housing in part extending between said top and bottom walls and in part extending between said side walls, said combined internal support and baffle means including supports extending between two opposite ones of said walls and secured to said walls by anchoring members, said housing walls being of a double wall construction including a central core, at least certain of said anchoring members including a mounting flange, said core being absent in alignment with said mounting flange and defining an internal recess in a respective one of said opposite walls, and said mounting flange being seated in said recess and secured to said double wall.

15. A fuel tank according to claim 14 wherein said supports are upright supports and said opposite walls are said top and bottom walls.

16. A fuel tank according to claim 14 wherein said internal recess is elongated longitudinally of said housing and receives a plurality of said mounting flanges, and said anchoring members extending transversely of said recess.

17. A fuel tank according to claim 16 wherein said anchoring members have other mounting flanges disposed on opposite sides of said recess, and means securing said other mounting flanges to said double wall including said core.

18. A fuel tank according to claim 16 wherein said recess is formed in said bottom walls and forms a sump.

19. A fuel tank according to claim 16 wherein said recess is formed in said top wall and forms a head space.

20. An access door assembly for a fuel tank of the double wall construction type including inner and outer skins and a central core, said assembly comprising an access opening in a wall of said fuel tank defined by edges of said skins and said core with said inner skin projecting beyond said core and said outer skin into said access opening, an opening defining ring received in said opening and having a smaller diameter inner flange clamped to said inner skin and a larger diameter outer flange clamped to said outer skin, and a door member seated in said opening, said door member being of a double wall construction including inner and outer door skins and a central core, a peripheral portion of said core being omitted with said inner door skin being folded outwardly and seated to a peripheral portion of said outer door skin, sealing means between said inner door skin peripheral portion and a central part of said ring, and replaceable fastening means releasably claiming said inner door skin peripheral portion against said ring outer flange.

* * * * *